US007458397B2

(12) United States Patent
Doyle

(10) Patent No.: US 7,458,397 B2
(45) Date of Patent: Dec. 2, 2008

(54) MODULAR FLUID DISTRIBUTION SYSTEM

(76) Inventor: Michael Doyle, 10001 Timothy La., Villa Park, CA (US) 92861

( * ) Notice: Subject to any disclaimer, the term of this patent is extended or adjusted under 35 U.S.C. 154(b) by 0 days.

(21) Appl. No.: 10/887,765

(22) Filed: Jul. 9, 2004

(65) Prior Publication Data

US 2006/0005891 A1 Jan. 12, 2006

(51) Int. Cl.
*F16K 11/10* (2006.01)

(52) U.S. Cl. ...................................................... 137/884

(58) Field of Classification Search .................. 137/884
See application file for complete search history.

(56) References Cited

U.S. PATENT DOCUMENTS 6,283,155 B1 * 9/2001 Vu ............................ 137/884
6,502,601 B2 * 1/2003 Eidsmore et al. ............ 137/884
6,546,961 B2 * 4/2003 Fukushima ................. 137/884
6,629,546 B2 * 10/2003 Eidsmore et al. ............ 137/884
6,644,353 B1 * 11/2003 Eidsmore .................... 137/884
6,776,193 B2 * 8/2004 Eidsmore .................... 137/884
6,874,538 B2 * 4/2005 Bennett ...................... 137/884
6,938,644 B2 * 9/2005 Eidsmore .................... 137/884
2002/0000256 A1 * 1/2002 Eidsmore et al. ............ 137/884
2003/0145895 A1 * 8/2003 Eidsmore .................... 137/884
2003/0209277 A1 * 11/2003 Nordstrom et al. .......... 137/884
2004/0112446 A1 * 6/2004 Eidsmore et al. ............ 137/884
2004/0168732 A1 * 9/2004 Perusek et al. .............. 137/884
2005/0056330 A2 * 3/2005 Eidsmore et al. ............ 137/884
2005/0224121 A1 * 10/2005 Milburn et al. .............. 137/884
2005/0263197 A1 * 12/2005 Eidsmore .................... 137/884

* cited by examiner

*Primary Examiner*—Gregory L. Huson
*Assistant Examiner*—Craig M Schneider
(74) *Attorney, Agent, or Firm*—Aaron P. McGushion

(57) ABSTRACT

A modular system for enabling a distribution of fluids, including a plurality of individual fluid path blocks that can be joined to substrate plates and component interfacing blocks to form gas sticks and gas panels. Each gas path block will have a fluid passageway with an entrance port and exit port accessing a common surface. Active components are mounted to the interfacing blocks, with each gas path block extending and interconnecting across immediately adjacent components in a stick or immediately adjacent sticks. Alignment features are provided to ensure that entrance and exit ports are accurately positioned to facilitate sealing.

8 Claims, 11 Drawing Sheets

MODULAR FLUID DISTRIBUTION SYSTEM

BACKGROUND

1. Field of Invention

This invention relates generally to fluid control systems. Particularly, this invention relates to a modular mounting system for chemical fluid control components of a chemical fluid control system.

2. Description of Prior Art

Fluid control components are used to control the delivery of a fluid (i.e., a gas or liquid) in industrial processes. Chemical delivery systems are used in numerous industries to control the flow of fluids, including gas reactants and other chemicals (e.g., liquids). Fluid control components are used to condition and control the delivery of fluids. Usually, these components are arranged so that fluid is carried through each of the components. For example, in semiconductor processing equipment, a variety of fluid control components are configured in a gas stick, which precisely controls the delivery of various fluids during semiconductor processing. In semiconductor processing, these systems are commonly used to control the flow of gases to and from processing chambers. Such processing often makes demanding requirements of chemical delivery systems. In chemical etch processes, for example, gas lines usually must be periodically changed out because of line corrosion and/or partial or complete system reconfiguration during maintenance. To minimize the downtime of the etch tool to which a chemical delivery system is attached, the gas lines of the chemical delivery system should be capable of quick removal and replacement.

FIG.1 illustrates a prior art gas stick (20). The gas stick (20) includes a set of fluid control components joined by multiple welds and fittings. One fluid control component depicted in FIG.1 is a shut-off valve (22). A pipe section (26) links the shut-off valve (22) to a sleeve or fitting (28) associated with a manual pressure regulator (24). The manual pressure regulator (24) has a fitting (30) on its opposite side for connection with a pipe section (32). Pipe section (32) is connected to a fitting (36) associated with a pressure transducer (34). The opposite side of the pressure transducer (34) also has a fitting (38) for connection with another pipe section. The remaining components in the figure are similarly configured with fittings for attachments to pipe sections. The gas stick (20) is attached to a substrate. Other gas sticks (not shown) may also be attached to the substrate to form a gas panel.

Those skilled in the art recognize a number of problems associated with prior art gas sticks of the type illustrated in FIG. 1. First, the multiple fittings and pipe sections need to be welded or otherwise secured to one another. The assembly of these components can be relatively labor intensive. Similarly, the disassembly of these components for repair or replacement can be extremely labor-intensive.

Another problem associated with gas stick (20) is that the numerous fittings and pipe sections produce a relatively long and heavy device. The attachment of the gas stick (20) to a substrate (50) also produces problems since the entire gas stick (20) must be removed from the substrate (50) in order to repair the gas stick (20).

Efforts to alleviate these problems have resulted in the use of interconnecting blocks on which components are mounted. These blocks contain machined passages through which gas flows, being directed in and out of components.

Interconnections between blocks or between sticks invariably include seals from block to block which result in additional complexity and accompanying degradation of system reliability. Additionally, sealing integrity is compromised in some cases by placing two or more seals between blocks to be compressed in series. The problem being that the degree of compression of the seals cannot be guaranteed to be equal at each junction; since a single joining force is applied to all seals in series and simultaneously. FIG. 2 shows prior art that makes use of rectangular blocks to build a gas panel composed of multiple gas sticks. Components such as valves, pressure regulators and mass flow controllers are mounted above the blocks by use of suitable fasteners and seals. Seals are used to make hermetic connections between blocks. All seals corresponding to a column of blocks are compressed using long fasteners that traverse all blocks.

Additionally, interconnection between sticks is accomplished using a second plane of transversal series of blocks. Seals are used to interconnect between the two planes of blocks.

Other prior art eliminates the use of two planes of blocks by incorporating into blocks gas passages for flow along the orientation of sticks and gas passages for flow between sticks. FIG. 3 illustrates this approach. However, seals are still required between blocks within a stick and between sticks.

Furthermore, it is common for entire gas sticks to become contaminated or corroded necessitating their replacement, as is the case, for example, in semiconductor fabrication processes that use $SiH_4$ in its gaseous state. Modular configurations, which include seals between sticks, preclude replacement of an entire stick without removal of neighboring sticks. It would be highly desirable to improve access such that replacing either any component or stick would not affect neighboring components or sticks.

What is needed is a gas stick that allows for the quick removal and replacement of system components. What is also needed is a gas stick that requires a minimum of labor-intensive welds and connections between components. Additionally, what is needed is a gas stick that does not require seals and gaskets to connect component blocks. Also, a lightweight and easy to assemble gas stick is needed.

SUMMARY OF THE INVENTION

The present invention is designed to provide a system for enabling the conditioning, control and distribution of fluids such as semiconductor processing gases and to provide an improved surface mount gas delivery system that does not make use of seals between blocks and requires only a single plane of interconnecting blocks.

The modular fluid distribution system receives chemical fluids gases at inlets and guides fluids into and out of conditioning and flow control components and delivers them to reactors such as those found in semiconductor fabrication tools. The fluid distribution system forms a substrate on which fluid-processing components such as regulators, valves, and mass flow controllers are attached. The invention is built with modular components that include base plates, fluid path blocks and component mounting blocks. Fluid path blocks are placed over the base plates and fasteners secure component-mounting blocks to the base plates enclosing the fluid path blocks and providing components receiving stations.

Base plates have threaded holes as well as guiding pins for precisely mounting and aligning fluid path blocks on one surface. A plurality of fluid path blocks, mounted on base plates and fastened together with component mounting blocks, form pathways arranged so that they receive gas, fluid, or vapor at an inlet and can pass the fluid along to a plurality of component receiving stations having an inlet and an outlet, with the fluid ultimately being delivered to the semiconductor manufacturing equipment.

In a semiconductor gas distribution system fluid is routed from inlets to a common outlet port delivering chemicals to the semiconductor manufacturing chamber or reactor. Fluid is conditioned and precisely measured by components normally arranged in a line, forming a stick. In addition, an inert gas may be routed to all sticks for the purpose of cleaning or purging sticks of hazardous residual chemicals during maintenance. In addition, the output from all sticks is combined prior to being delivered to the reactor. Generally, purging and combining of gases across sticks is accomplished by creating manifolds of fluid pathways transverse to the flow along sticks and connecting to each stick making use of three-port valves or a combination of two-port valves.

The invention provides for transverse flow of gases across sticks using manifold blocks fabricated in multiple units of length, each unit of length representing the distance between sticks, thus interconnecting a given number of sticks on a single plane and without the use of seals between sticks. Manifold blocks are placed on base plates in the same manner as fluid path blocks, the only difference is that the fluid path blocks guide flow in a direction along sticks and manifold blocks direct flow in a direction transverse to the length of sticks.

Aligned thru-holes are provided on component mounting blocks and base plates to allow fastening of the distribution system to a structural plate to provide the rigidity necessary for handling, packaging and transporting as well as mounting inside the semiconductor-manufacturing equipment.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
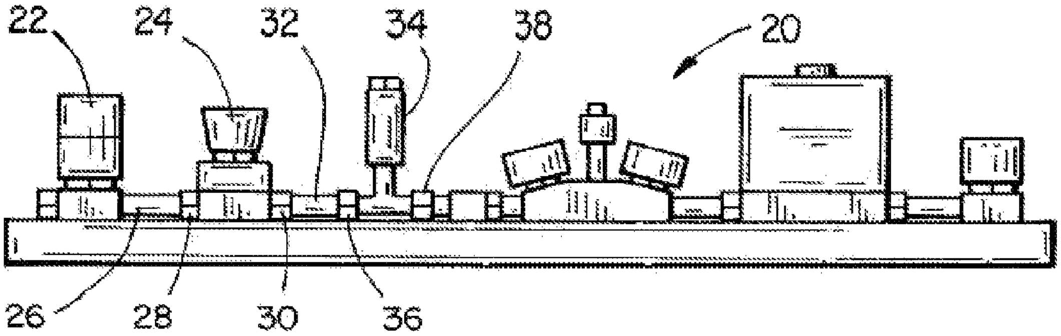
FIG. 1 (PRIOR ART)
FIG. 1 is a side view of a prior art gas stick.
Figure 2:
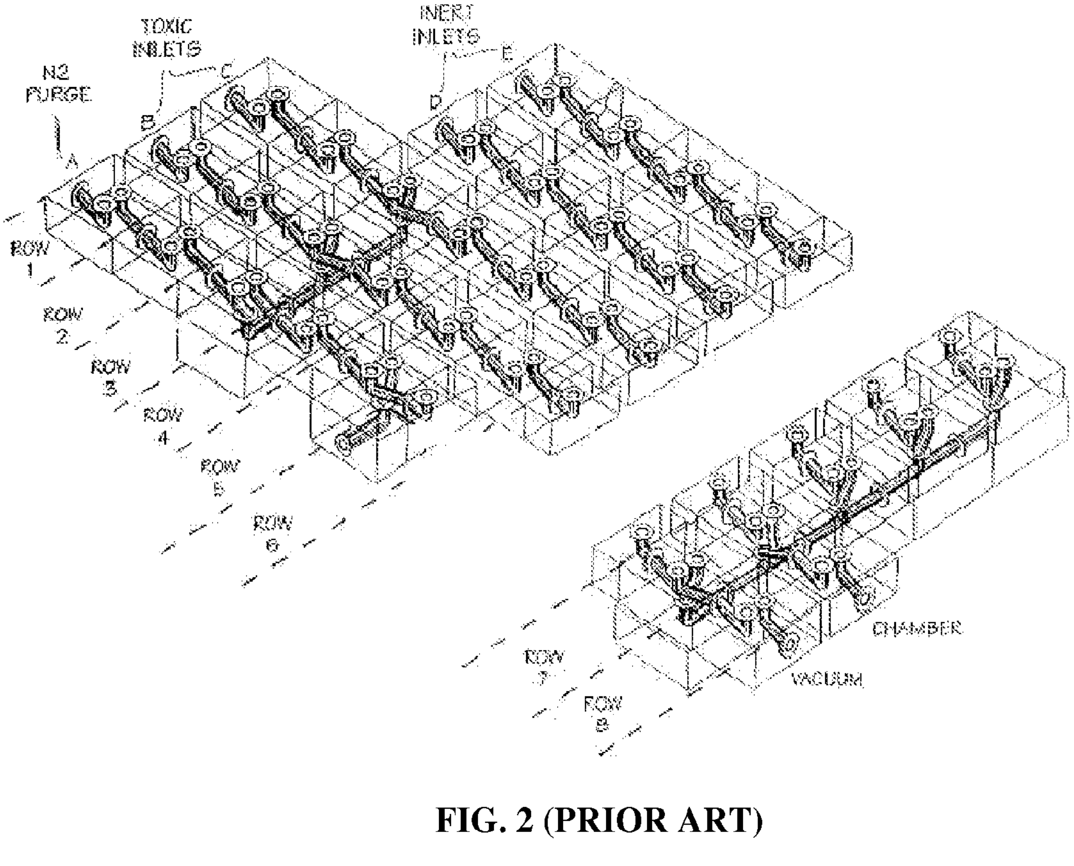
FIG. 2 (PRIOR ART)
FIG. 2 is a perspective view of a prior art gas distribution system using interconnecting blocks.
Figure 3:
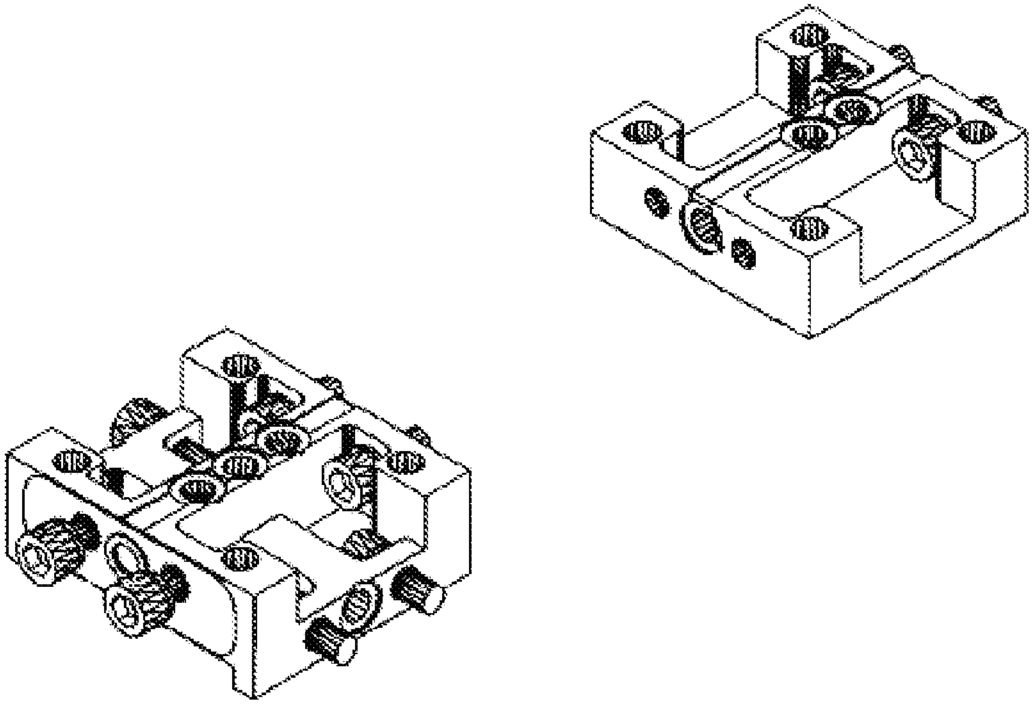
FIG. 3 (PRIOR ART)
FIG. 3 is a perspective view of prior art interconnecting blocks.
Figure 4:
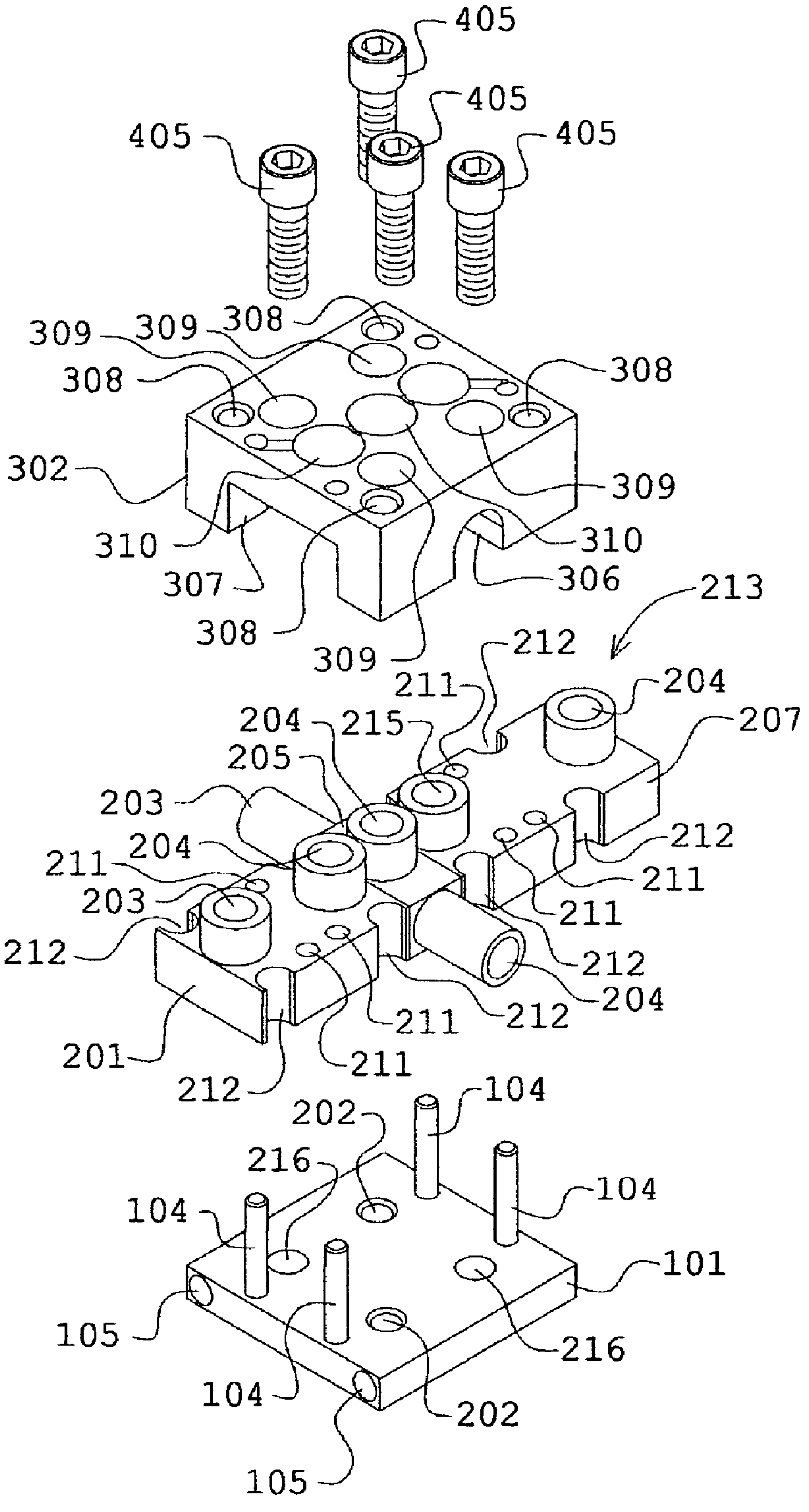
FIG. 4 is an exploded view of the present invention.

FIG. 4 is a perspective view of the building elements used in the invention. A modular fluid distribution system for use with fluid control components can be built using these building elements in accordance with an embodiment of the invention. The invention includes three major components: first base plate (101), first component mounting block (302), the following fluid path blocks: first fluid path block (201), second fluid path block (205), and third fluid path block (207). Although three fluid path blocks are illustrated in this example, fewer fluid path blocks can be used in practice. Base plates (101) are provided with guiding pins (104), mating to guiding pin holes (211) in fluid path blocks (201), (205), (207), and used to precisely align them with respect to base plates (101) and component mounting blocks (302).

Again, looking at FIG. 4, the first base plate (101) has four guiding pins (104) inserted and cartridge heater holes (105) ready to receive a heating means if required. Although there are numerous configurations for the present invention, one configuration is shown by way of illustration. In this configuration, a first fluid path block (201), a second fluid path block (205), and a third fluid path block (207) are laid side by side, in the arrangement required, and placed on the first base plate (101), with the guiding pins (104) inserted into the mating guiding pin holes (211), to obtain the correct alignment. The first component mounting block (302) is installed over the fluid path block assembly (213), with the fasteners (405) inserted through the fastener orifices (309), through the fastener clearance grooves (212), and threaded into the threaded holes, securely sandwiching the fluid path block assembly (213) and creating a secure assembly. The hemispherical slots (306) and the rectangular slots (307) create sufficient clearance to allow the fluid path block assembly (213) to connect with other assemblies and components.

Figure 5:
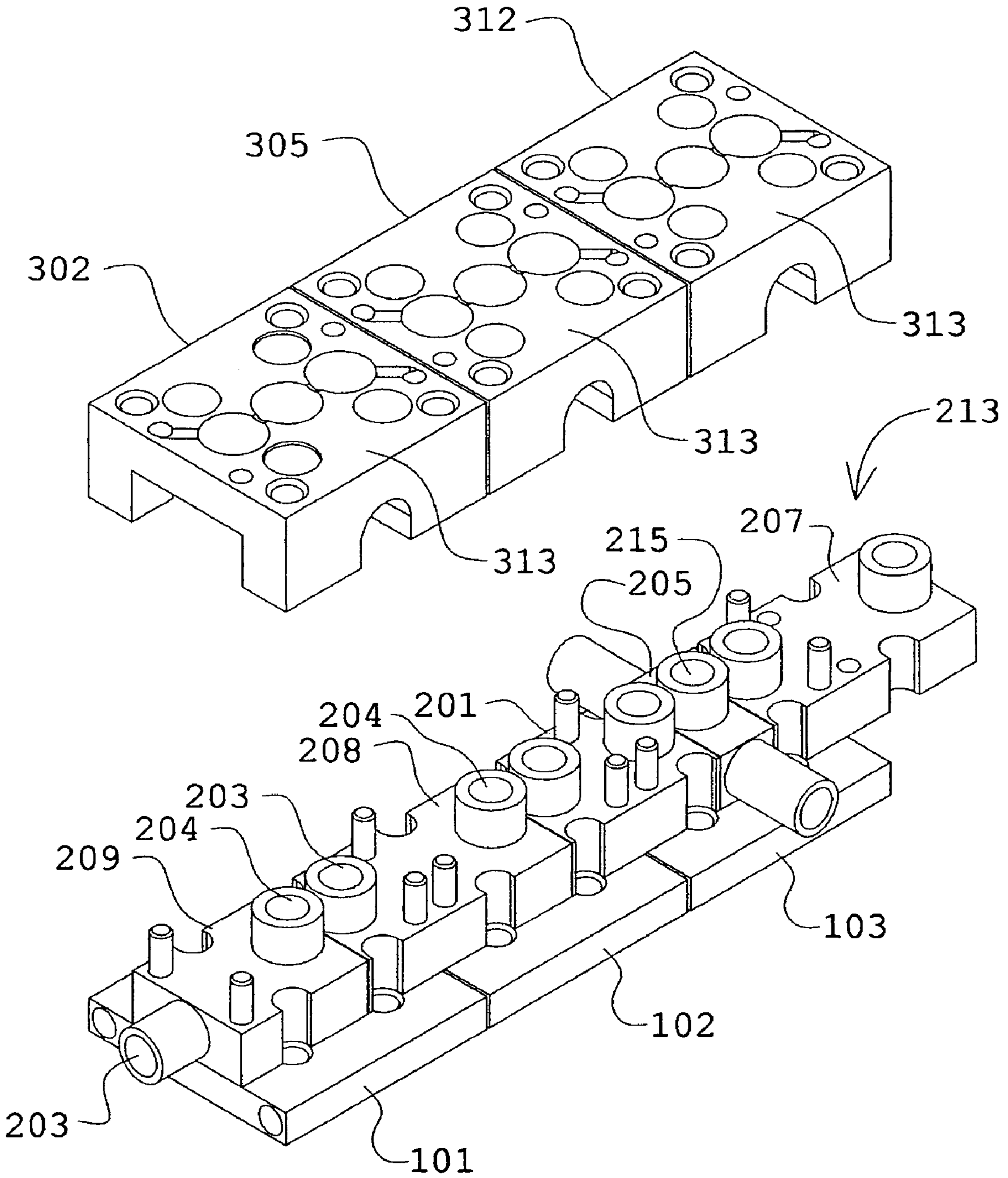
FIG. 5 is an exploded view of several components of the present invention.
Figure 7:
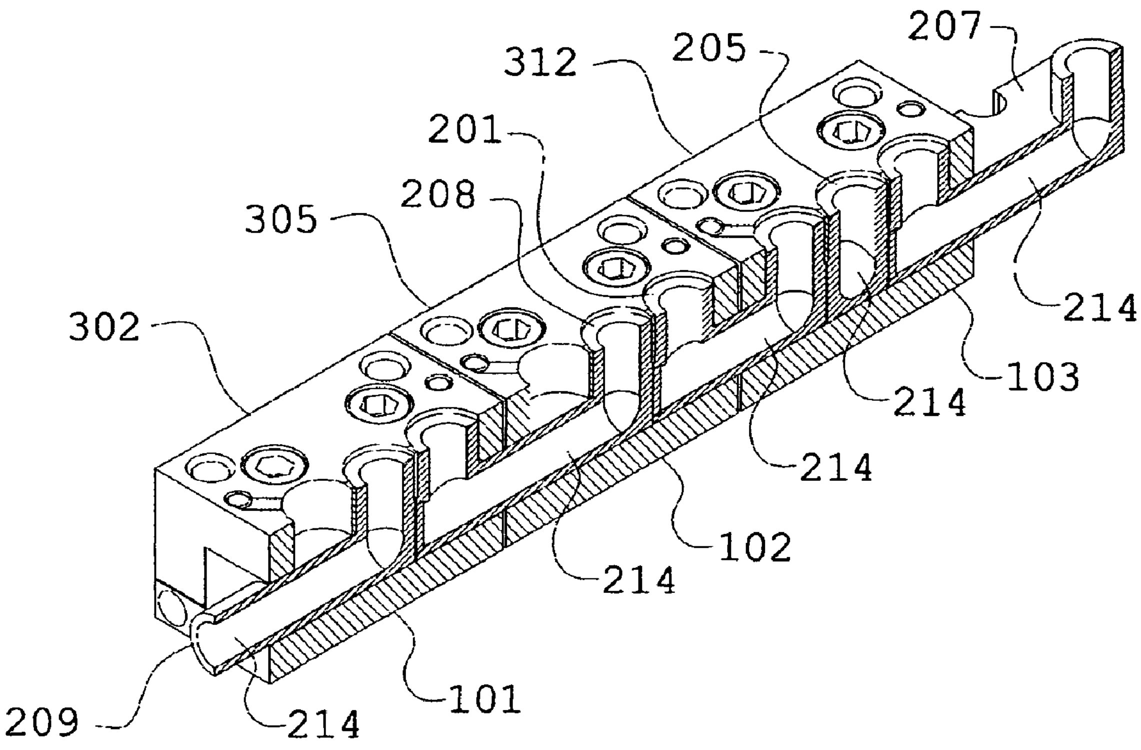
FIG. 7 is an assembled cut-away view of the present invention.

As can be seen in FIG. 5 and FIG. 7, fluid path blocks (209), (208), (201), (205), and (207) are constructed with fluid passages (214) designed to transmit fluids from a fluid inlet (203) to components for conditioning and control. In the fifth fluid path block (209), fluid enters the block through a fluid inlet (203) located towards the front of the fifth fluid path block (209) and is transmitted to fluid outlet (204) where it connects with a component (not shown). Similarly, the fourth fluid path block (208) receives fluid from fluid inlet (203), where it enters the fourth fluid path block (208) after being processed by the component (not shown), towards fluid outlet (204), where it enters a second component (not shown). It should be noted that outlets and inlets of fluid path blocks are shaped to accept metal seals common in the industry, which are used to keep hermetic junctions with corresponding inlets and outlets of components.

Use of fluid path blocks such as (201), (205), (207), (208), and (209) directs fluid in a general direction along a stick, causing fluid to be conditioned and controlled by components as it makes its way from the front to the back of a stick.

In a typical fluid distribution system, it is desirable to introduce an inert second fluid into the stick for the purposes of purging out hazardous fluids during maintenance functions. Introduction of this second fluid is effected using a specific fluid path block called the fluid manifold block (205) and three-port valves common to the industry, which are designed to block or permit the flow from a center port (215). Manifold block (205) is used for this purpose. FIGS. 4 and 5 shows a single position manifold by way of illustration. The manifold block (205) is intended to form a fluid pathway between sticks. This is accomplished by welding together as many repeated sections of manifold block (205), as there are sticks to be supplied with the second fluid.

A particular aspect of the invention is that all fluid pathways are mounted on a single plane of interconnection without the use of seals between any fluid path blocks. It should be noted that this feature of the invention permits access and allows the removal of all components and fluid path blocks belonging to a single stick without having to remove adjacent sticks. This aspect of the invention is useful for maintenance when a stick becomes "dusted" or contaminated as it may occur in processes utilizing SiH4 gas.

In some applications of the invention, a stick may be required to be heated in order to avoid formation of drops of liquid from a vapor whose condensation temperature may be at or around the expected ambient temperature. In this case, a cartridge heater common to the industry may be installed through numerous base plates (101), (102), (103) through cartridge heater hole (105). The temperature can then be controlled by the amount of power applied to the cartridge heater (not shown). Closed-loop control of temperature can be added by means of monitoring thermocouples integral to the cartridge heater or suitably attached to components, or component mounting blocks.

Figure 6:
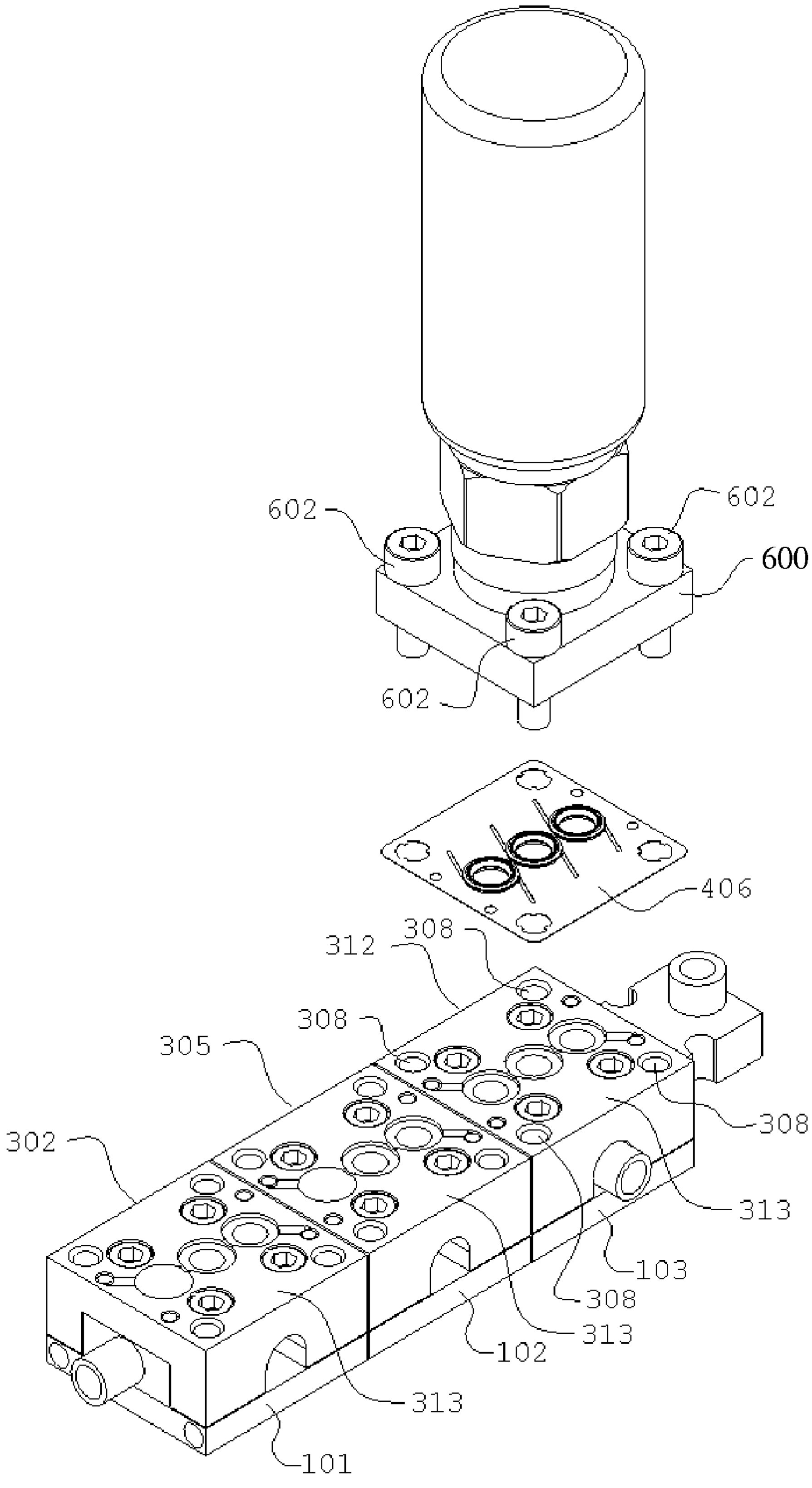
FIG. 6 is a perspective of the assembled blocks forming a substrate.
Figure 11:
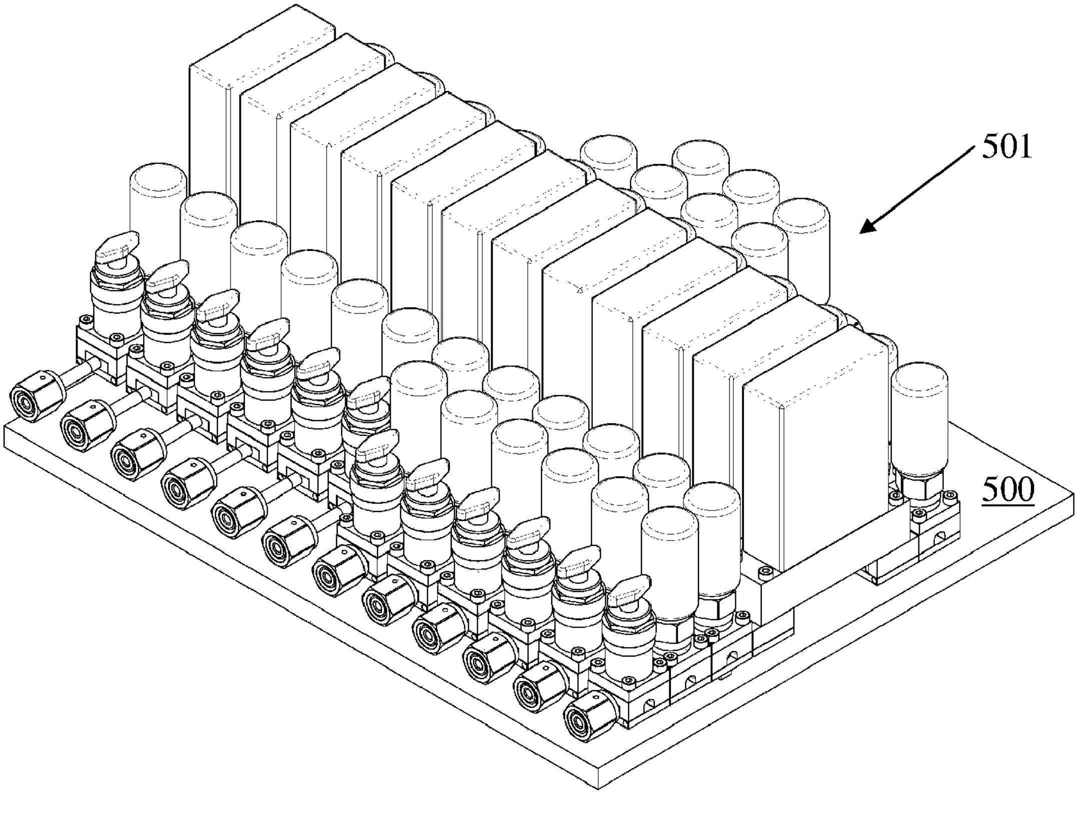
FIG. 11 is a perspective view of the present invention assembled into a potential configuration.

Again, in FIGS. 4, 5, and 6, component mounting blocks (302), (305), and (312) are placed over fluid path blocks (201), (207), (208), and (209) and manifold block (205) and fastened to the threaded holes (202) using fasteners (405). The component mounting blocks (302), (305), and (312) include component mounting threaded holes (308) on the component mounting surface (313) and at each corner for the purposes of securing components to the component mounting surface (313) and orifices (310). Sandwiched between the component (600) and the component mounting surface (313) is a seal assembly (406), containing three seals, the component (600) being fastened down by fasteners (602). As seen in FIG. 11, sticks can be attached to a structural plate (500) using fasteners (405), which protrude through holes (216).

FIG. 7 shows a cutaway view of the stick illustrated by FIG. 6. Internal fluid paths (214) are shown in fluid path blocks (201), (205), (207), (208) and (209).

Figure 8A:
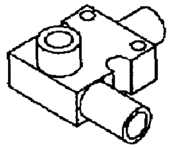
FIG. 8A-N are perspective views of the fluid path blocks of the present invention
Figure 8B:
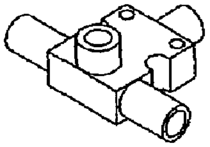
Figure 8C:
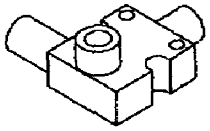
Figure 8D:
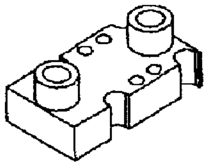
Figure 8E:
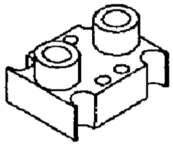
Figure 8F:
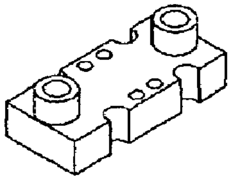
Figure 8G:
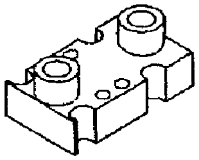
Figure 8H:
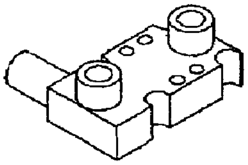
Figure 8I:
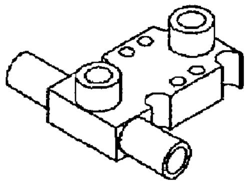
Figure 8J:
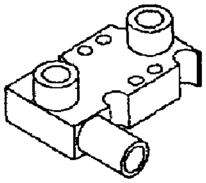
Figure 8K:
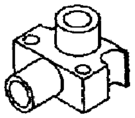
Figure 8L:
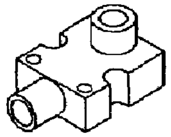
Figure 8M:
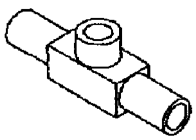
Figure 8N:
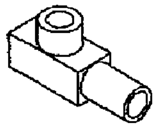

FIG. 8A-N shows the some of the preferred embodiments of the fluid path blocks of the present invention. Although these figures illustrate the fluid path blocks needed for most common applications, other applications may arise, requiring reconfigurations of the fluid path blocks of the present invention without deviating from the inventive concept presented. The illustrated set of blocks can be used to configure a large majority of fluid distribution systems used in the manufacture of semiconductors.

Figure 9A:
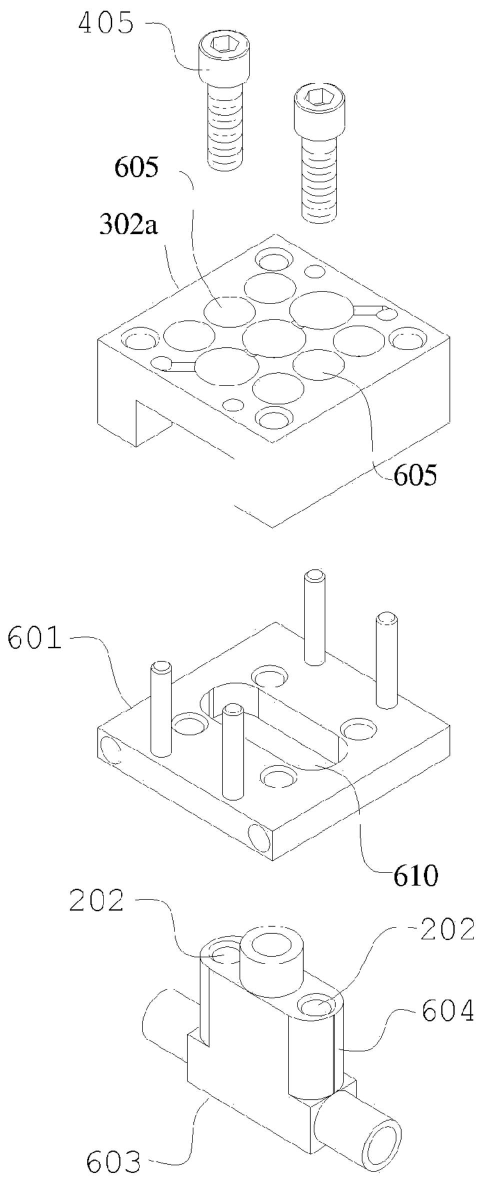
FIG. 9A-B are perspective views of the present invention modified to allow a second plane flow path.
Figure 9B:
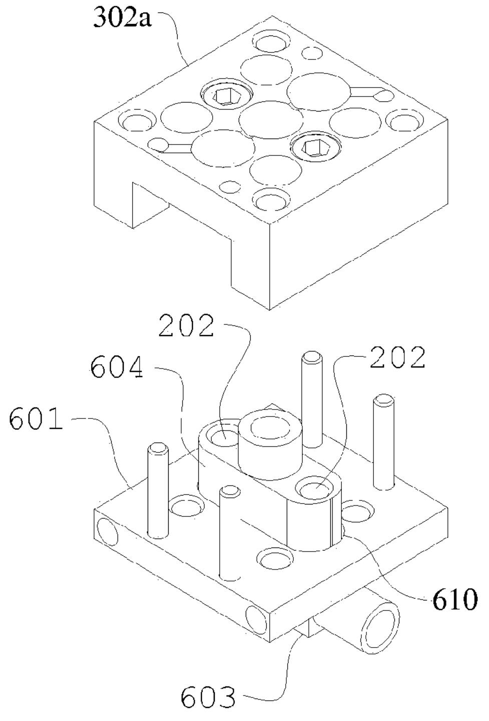
Figure 10A:
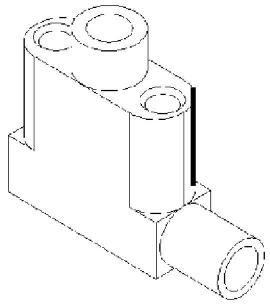
FIG. 10A-F are perspective views of a set of fluid path blocks of the present invention modified to allow a second plane flow path.
Figure 10B:
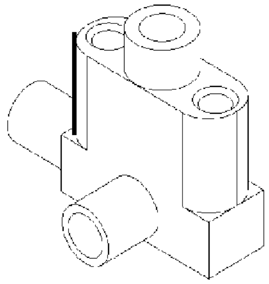
Figure 10C:
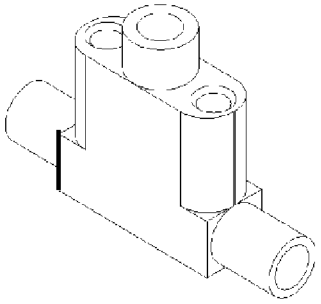
Figure 10D:
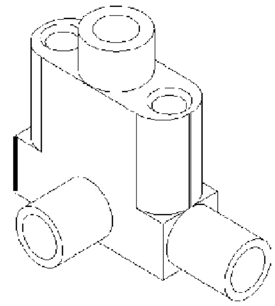
Figure 10E:
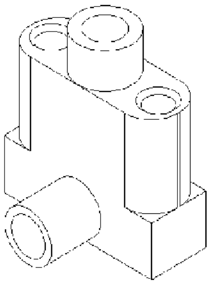
Figure 10F:
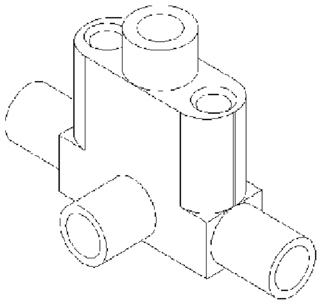

As can be seen in FIG. 9A the slotted base plate (601) has a through slot (610) to allow the modified fluid path block (603) to be inserted from beneath the slotted base plate (601), with the elongated neck (604) extending to the first component mounting block (302*a*). The modified fluid path block (603) is fastened to the first component mounting block (302*a*) by screws (405) inserted through hole (605), threaded into threaded hole (202). This arrangement allows for the creation of a second flow path plane, without any additional levels of seals. FIG. 9B shows the modified fluid path block (603) installed as designed through the through slot (610) and ready to interface with the first component mounting block (302*a*). The modified fluid path block (603) can be used in combination with the fluid path blocks (201), (205), (207), and (209).

FIG. 10A-F shows some of the possible variations of the modified fluid path block (603) in the preferred embodiments. Although again, these figures illustrate the modified fluid path blocks needed for most common applications, other applications may arise, requiring reconfigurations of the fluid path blocks of the present invention without deviating from the inventive concept presented.

FIG. 11 illustrates a completed modular fluid distribution system (501) that has been assembled with manual valves, pneumatic valves, and mass flow controllers and mounted on a structural plate (500). The distribution system is composed of twelve sticks all placed in parallel. Six of the sticks have purge facilities and therefore make use of manifold blocks.

Figure 12:
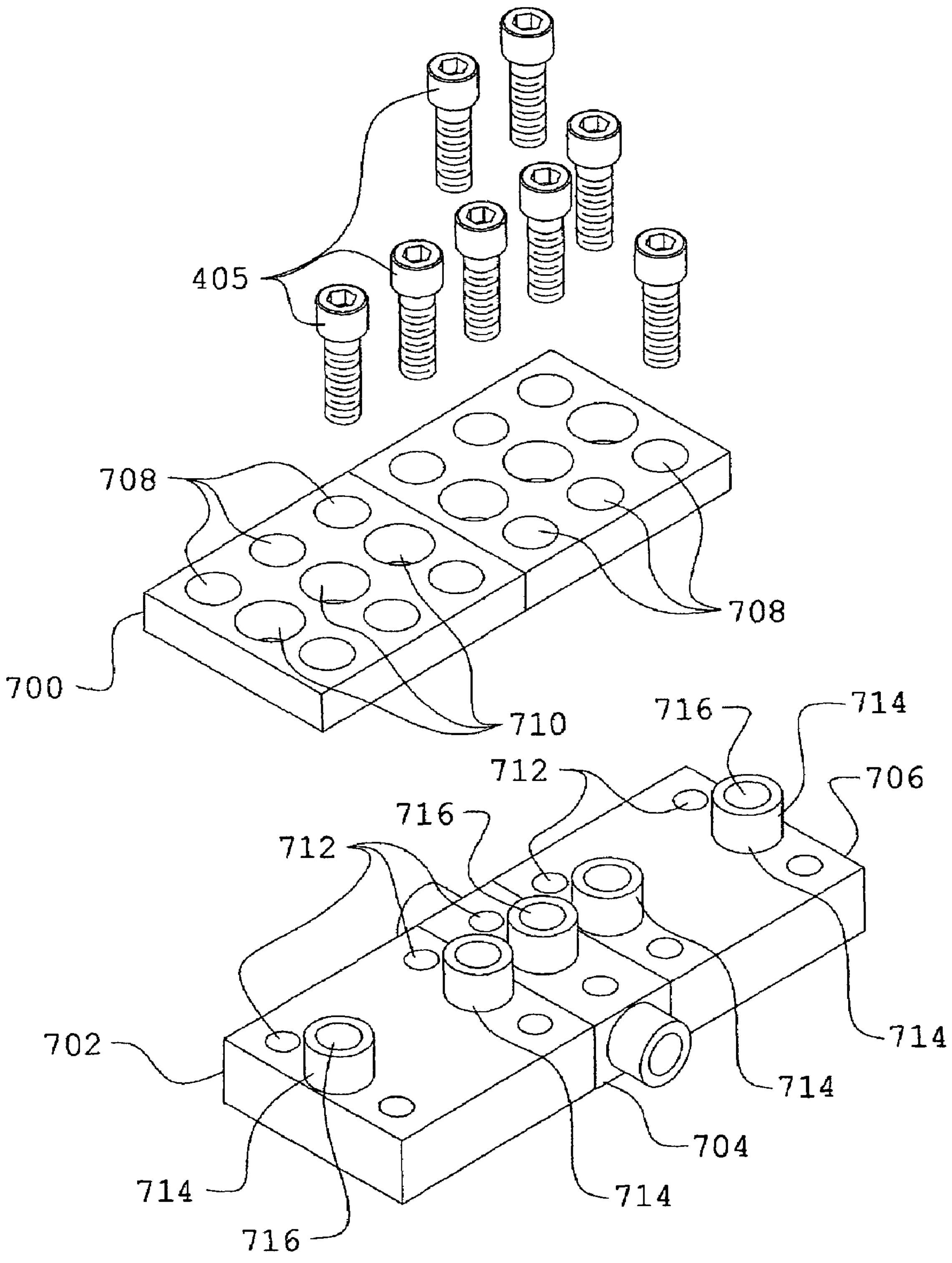
FIG. 12 is a perspective view of an alternate embodiment of the present invention.

Looking at FIG. 12, an alternate embodiment of the present invention can be seen. The modified component mounting block (700) has three structure orifices(710) formed through the block; different applications may require more or fewer structure orifices (710). Additionally, a plurality of countersunk fastener orifices (708) are formed through the modified component mounting block (700), to allow the fasteners (405) to connect the modified component mounting block (700) to the first, second and third fluid path blocks (702), (704), and (706) respectively. The fasteners (405) are threaded into the threaded holes (712). The structures (714) with ports (716) are inserted into the structure orifices (710). Fluid components (not shown) can be attached to the modified component mounting block (700), with the fasteners (405) connecting the fluid components to the first, second and third fluid path blocks (702), (704), and (706), with the modified component mounting block (700) being sandwiched between the two.

The present invention can be practiced utilizing common mechanical assembly, manufacturing, and machining methods, such as milling, turning, polishing, and other means obvious to those familiar in the art. The U-shaped fluid path blocks, such as the fourth fluid path block (208), can be constructed through drilling and plugging means familiar to those familiar to the art.

The present invention provides an improved means of creating a gas stick assembly for the semiconductor and similar industries. The present invention provides a easy to assemble and repair system. Additionally, the present invention eliminates the need for seals and gaskets between component blocks, decreasing the risk of leaks in the completed system. Also, components of the completed gas stick can be easily removed and replaced without disassembling a significant portion of the gas stick assembly. And additionally, one preferred embodiment of the present invention allows for the direct connection between two layers in a gas stick without using interconnects or seals between layers. The present invention eliminates the need for grooves to support the position of the fluid blocks. The presented invention also eliminates many of the welds and connections seen in the prior art. Additionally, the fluid flow through fluid path blocks of the present invention are independent of the component mounting block, allowing for a variety of flow path configurations by changing the fluid path blocks. And the design of the present invention tends to reduce the overall weight of the completed modular fluid distribution system.

While the present invention has been described with regards to particular embodiments, it is recognized that additional variations of the present invention may be devised without departing from the inventive concept.

Having thus described the invention, it is now claimed:

1. A modular fluid delivery block for the mounting thereon of a fluidic control component comprising:

at least one fluid path block, said fluid path block having a body, a plurality of extensions protruding from said body, a plurality of fluid ports, and at least one fluid passage, one said fluid port being located at the terminus of each of said extension, at least one fluid passage communicating between at least two of said fluid ports;

a base plate, said base plate having a top surface;

a component mounting block, said component mounting block having a mounting surface, four lateral walls, a bottom face, a clearance, and a plurality of orifices being formed from said mounting surface to said clearance, said mounting surface being configured to mountably receive said fluidic control component, said clearance being formed in said bottom face, said clearance being formed through two sets of opposing said lateral walls, said clearance being configured to receive at least a portion of at least one said fluid path block, said orifices being configured to receive said extension;

wherein at least one said fluid path block is at least partially interposed between said base plate and said clearance of said component mounting block, at least one said extension being in alignment with at least one said orifice, said fluid port on said extension being configured to be in hermetic fluid communication with a fluidic component port fluidly through a seal, at least a portion of said fluid path block extending through said clearance and beyond a perimeter formed by said lateral walls, at least one said fluid port being located beyond said perimeter, said component mounting block being fastened to said base plate.

2. The modular fluid delivery block of claim 1, wherein a single fluidic control component assembly is created comprising: at least one fluid path block, said base plate, said component mounting block, and a first fluidic control component, said first fluidic control component being fastened to said mounting surface, a first fluid path block being in hermetic fluid communication with said first fluidic control component.

3. The modular fluid delivery block of claim 2, wherein a dual fluidic control component assembly is further created comprising: a first single fluidic control component assembly and a second single fluidic control component assembly, a first portion of said first fluid path block lying within a first perimeter of said first single fluidic control component assembly and a second portion of said first fluid path block lying within a second perimeter of said second single fluidic control component assembly, a first fluid port being in hermetic fluid communication with said first fluidic control component, a second fluid port being in hermetic fluid communication with a second fluidic control component being integrated with said second single fluidic control component assembly.

4. The modular fluid delivery block of claim 3, wherein a multiple fluidic control component assembly is further created comprising: said dual fluidic control component assembly and at least one further single fluidic control component assembly.

5. The modular fluid delivery block of claim 1 further comprising a plurality of guiding pins, said guiding pins being mounting normally to said top surface of said base plate, a plurality of clearance holes being formed through said body of said fluid path block, said clearance holes being configured to receive said guiding pins, said guiding pins substantially maintaining the position of said fluid path blocks relative to said base plate.

6. The modular fluid delivery block of claim 1, wherein a slot is formed through said base plate; and wherein at least one threaded hole is formed in said fluid path block; and wherein at least one countersunk fastener through hole is formed in said component mounting block on said mounting surface; at least one screw being inserted into said countersunk fastener through hole, said screw fastening said fluid path block to said component mounting block, at least one said extension being in alignment with at least one said orifice, said slot providing sufficient clearance to allow a portion of said fluid path block to be inserted therethrough.

7. The modular fluid delivery block of claim 1, further comprising: at least one threaded hole, said threaded hole being formed on said top side, said threaded hole being configured to receive a fastener.

8. A modular fluid delivery block for the mounting thereon of a fluidic control component comprising:

at least one fluid path block, said fluid path block having a body, a plurality of extensions protruding from said body, a plurality of fluid ports, and at least one fluid passage, one said fluid port being located at the terminus of each of said extension, at least one fluid passage communicating between at least two of said fluid ports;

base plate, said base plate having a top surface;

a plurality of guiding pins, said guiding pins being mounting normally to said top surface of said base plate, a plurality of clearance holes being formed through said body of said fluid path block, said clearance holes being configured to receive said guiding pins, said guiding pins substantially maintaining the position of said fluid path blocks relative to said base plate;

a component mounting block, said component mounting block having a mounting surface, four lateral walls, a bottom face, a clearance, and a plurality of orifices being formed from said mounting surface to said clearance, said mounting surface being configured to mountably receive said fluidic control component, said clearance being formed in said bottom face, said clearance being formed through two sets of opposing said lateral walls, said clearance being configured to receive at least a portion of at least one said fluid path block, said orifices being configured to receive said extension, at least one countersunk fastener through hole is formed on said mounting surface and at least one threaded hole being formed in said base plate, at least one screw being inserted into said countersunk fastener through hole, said screw fastening said component mounting block to said base plate;

wherein at least one said fluid path block is at least partially interposed between said base plate and said clearance of said component mounting block, at least one said extension being in alignment with at least one said orifice, said fluid port on said extension being configured to be in hermetic fluid communication with a fluidic component port fluidly through a seal, at least a portion of said fluid path block extending through said clearance and beyond a perimeter formed by said lateral walls, at least one said fluid port being located beyond said perimeter, said component mounting block being fastened to said base plate.

* * * * *